US008915525B2

(12) United States Patent
Critchley

(10) Patent No.: US 8,915,525 B2
(45) Date of Patent: Dec. 23, 2014

(54) HOOD RESTRAINT DEVICE

(75) Inventor: David J. Critchley, Oak Ridge, NC (US)

(73) Assignee: Volvo Group North America, LLC, Greensboro, NC (US)

(*) Notice: Subject to any disclaimer, the term of this patent is extended or adjusted under 35 U.S.C. 154(b) by 1339 days.

(21) Appl. No.: 12/556,832

(22) Filed: Sep. 10, 2009

(65) Prior Publication Data

US 2010/0066104 A1   Mar. 18, 2010

Related U.S. Application Data

(60) Provisional application No. 61/192,306, filed on Sep. 17, 2008.

(51) Int. Cl.
*E05B 3/00* (2006.01)
*B62D 25/10* (2006.01)
*E05C 17/14* (2006.01)

(52) U.S. Cl.
CPC ............. *E05C 17/14* (2013.01); *B62D 25/10* (2013.01)
USPC ................................................ 292/336.3

(58) Field of Classification Search
CPC ........ E05B 13/002; E05B 85/26; E05B 83/16
USPC ........... 292/194, 216, 214, 217, 240, 242, 1, 292/95, 96, 99, 100, 195, 200, 256, 256.69, 292/DIG. 11, DIG. 14, DIG. 15, DIG. 49; 16/231, 319, 324, 343, 347, 349; 296/193.11, 190.06; 180/69.2, 69.21
See application file for complete search history.

(56) References Cited

U.S. PATENT DOCUMENTS

| 1,598,868 | A | * | 9/1926 | Lundelius | ................... 180/69.21 |
| 2,947,376 | A | | 8/1960 | Norrie | |
| 3,017,944 | A | | 1/1962 | Norrie | |
| 3,730,575 | A | * | 5/1973 | Arlauskas et al. | ............. 292/216 |
| 3,905,624 | A | * | 9/1975 | Fujita | ............................... 292/11 |

(Continued)

*Primary Examiner* — Kristina Fulton
*Assistant Examiner* — Nathan Cumar
(74) *Attorney, Agent, or Firm* — Michael Pruden; Martin Farrell

(57) ABSTRACT

A restraint device includes a latch and a catch. The latch is rotatable between a first latch position and a second latch position about a latch axis of rotation, which is remote from the latch. The catch is provided with a first arm and a second arm. The catch is rotatable about a catch axis of rotation between a first catch position and a second catch position. The catch axis of rotation extends through the catch. When the catch is in the first catch position, the latch, as it is rotated from the first latch position toward the second latch position, contacts the first arm to rotate the catch about the catch axis of rotation, thereby allowing the latch to rotate about the latch axis of rotation past the catch. When the catch is in the first catch position, the latch, as it is rotated from the second latch position toward the first latch position, contacts the first arm, which thereby engages the latch and restrains further rotation of the latch about the latch axis of rotation toward the first latch position. When the catch is in the second catch position, the latch, as it is rotated from the second latch position toward the first latch position, contacts the second arm to rotate the catch about the catch axis of rotation, whereby the catch transitions from the second position to the first position as the latch rotates about the latch axis of rotation past the catch and toward the first latch position.

18 Claims, 20 Drawing Sheets

(56) References Cited

U.S. PATENT DOCUMENTS

| | | | |
|---|---|---|---|
| 4,566,552 A | | 1/1986 | Hoffman |
| 4,875,724 A | * | 10/1989 | Gruber .......................... 292/216 |
| 5,566,423 A | | 10/1996 | Hassler |
| 5,611,584 A | * | 3/1997 | Giese et al. ................... 292/338 |
| 6,149,210 A | * | 11/2000 | Hunt et al. .................... 292/216 |
| 6,167,977 B1 | * | 1/2001 | Adamson et al. ............ 180/69.2 |
| 6,213,235 B1 | * | 4/2001 | Elhardt et al. ............... 180/69.2 |
| 6,394,211 B1 | | 5/2002 | Palenchar |
| 6,547,291 B1 | * | 4/2003 | Schwaiger .................... 292/216 |
| 6,892,843 B2 | | 5/2005 | Schillaci |
| 7,137,656 B2 | * | 11/2006 | Bird et al. ................ 292/341.12 |
| 7,390,036 B2 | | 6/2008 | Marrs |
| 2006/0170224 A1 | * | 8/2006 | Mitchell et al. ............... 292/216 |

\* cited by examiner

HOOD RESTRAINT DEVICE

This application claims the benefit of U.S. Provisional Application No. 61/192,306, filed Sep. 17, 2008, the disclosure of which is hereby incorporated herein by reference.

FIELD OF THE INVENTION

The present invention relates to a restraint device and particularly in a preferred form to a hood restraint device that prevents a hood from closing when a catch is in a first position and allows the hood to close when the catch is in a second position.

BACKGROUND OF THE INVENTION

Vehicles typically have hinged hoods that open and close about an axis of rotation. In such arrangements it may be desirable to prevent an open hood from closing unintentionally, as this may cause serious injury.

Restraint arrangements have been devised to prevent hoods from closing unintentionally. One arrangement utilizes a slotted brace that attaches to the hood. A pin attached to the chassis slides within the slot on the brace as the hood closes. In this arrangement, the hood is prevented from closing since the slot is shaped so that the pin can only slide within the slot for a limited distance as the hood rotates about a hood axis of rotation toward a closed position. In order to close the hood, the brace is lifted with a lever, which releases the pin from the slot. A flange on the brace is used to return the lever to its previous position. This arrangement is difficult to adapt for use in certain models and designs due to large variations in the design of vehicle frame and variations in the hood and radiator mounting. Furthermore, since the hood experiences a certain amount of movement during operation, this arrangement may generate excessive wear on the restraint components, thus limiting their life and potentially changing the relative position of the restraint components, which may cause them to jam or not engage correctly.

In another arrangement, a gas spring is used to assist with the opening of the hood and to also prevent the hood from unintentionally closing. The spring includes a cylinder, a rod that slides within the cylinder, and a sleeve that slides around the cylinder. When the hood is fully open, the rod is fully extended, and the sleeve is sprung towards and against the end of the rod furthest from the cylinder and under the cylinder, thus restraining the rod from retracting within the cylinder and the hood from closing. In order to close the hood, the sleeve is aligned coaxially with the cylinder and held in place with a magnet. In this arrangement, the gas spring is relatively expensive and may become damaged if the hood is forced closed while the sleeve is extended.

In yet another arrangement, a cable is attached to the hood and a clasp is anchored to the chassis when the hood is open. The cable is provided with a length that becomes taut in the event the hood moves in the closed direction to thereby restrain the hood from closing. This arrangement requires an operator to attach the cable if he wants to restrain the hood.

The present invention is directed to an improved restraint device.

SUMMARY OF THE INVENTION

According to one embodiment of the present invention, a restraint device includes a latch and a catch. The latch is rotatable between a first latch position and a second latch position about a latch axis of rotation, which is remote from the latch. The catch is provided with a first arm and a second arm. The catch is rotatable about a catch axis of rotation between a first catch position and a second catch position. The catch axis of rotation extends through the catch. When the catch is in the first catch position, the latch, as it is rotated from the first latch position toward the second latch position, contacts the first arm to rotate the catch about the catch axis of rotation, thereby allowing the latch to rotate about the latch axis of rotation past the catch. When the catch is in the first catch position, the latch, as it is rotated from the second latch position toward the first latch position, contacts the first arm, which thereby engages the latch and restrains further rotation of the latch about the latch axis of rotation toward the first latch position. When the catch is in the second catch position, the latch, as it is rotated from the second latch position toward the first latch position, contacts the second arm to rotate the catch about the catch axis of rotation, whereby the catch transitions from the second position to the first position as the latch rotates about the latch axis of rotation past the catch and toward the first latch position.

DETAILED DESCRIPTION OF THE INVENTION

Figure 1:
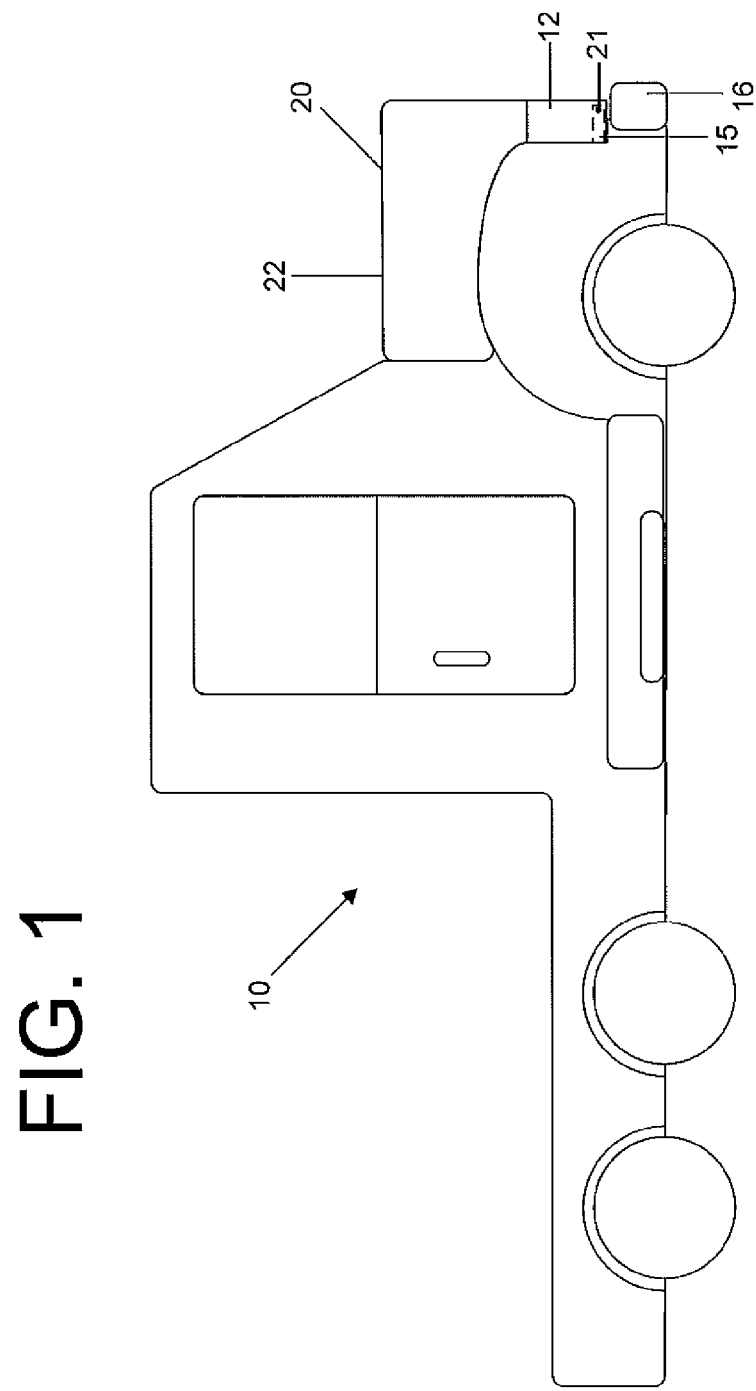
FIG. 1 is a side view of a vehicle according to one embodiment showing a hood in a closed position.
Figure 2:
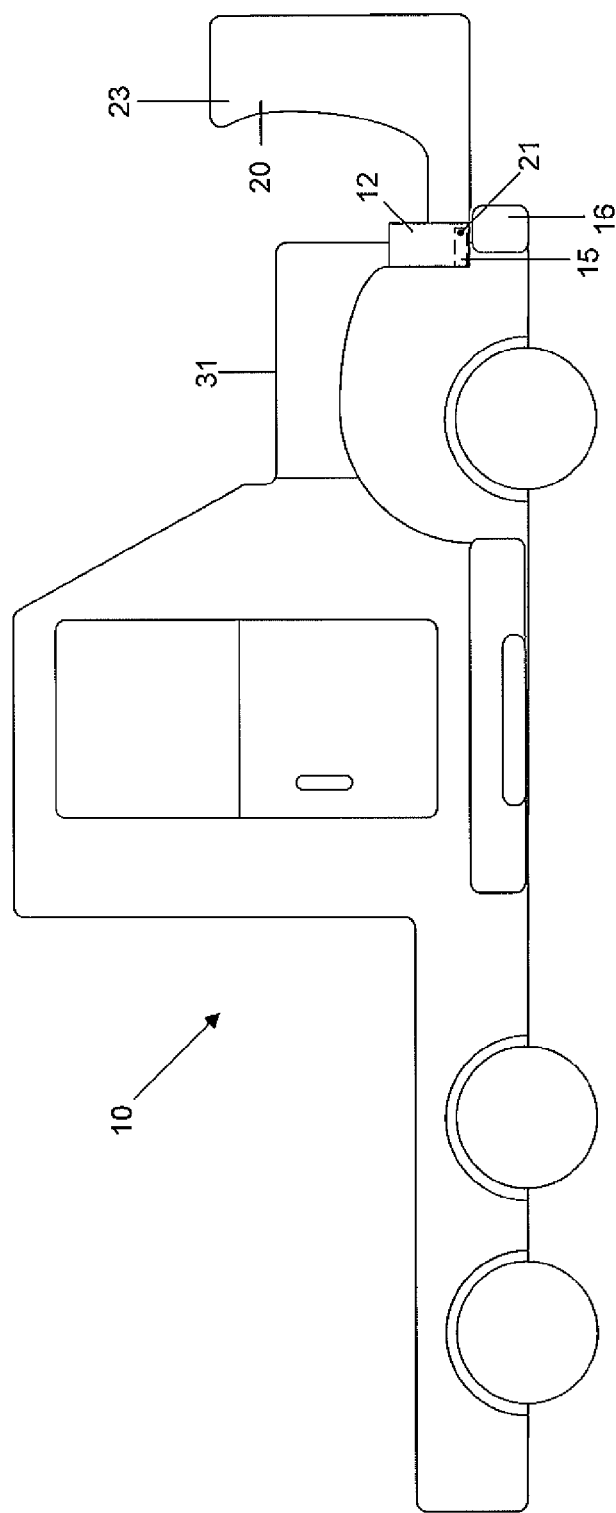
FIG. 2 is a side view of a vehicle according to one embodiment showing a hood in an open position.
Figure 3:
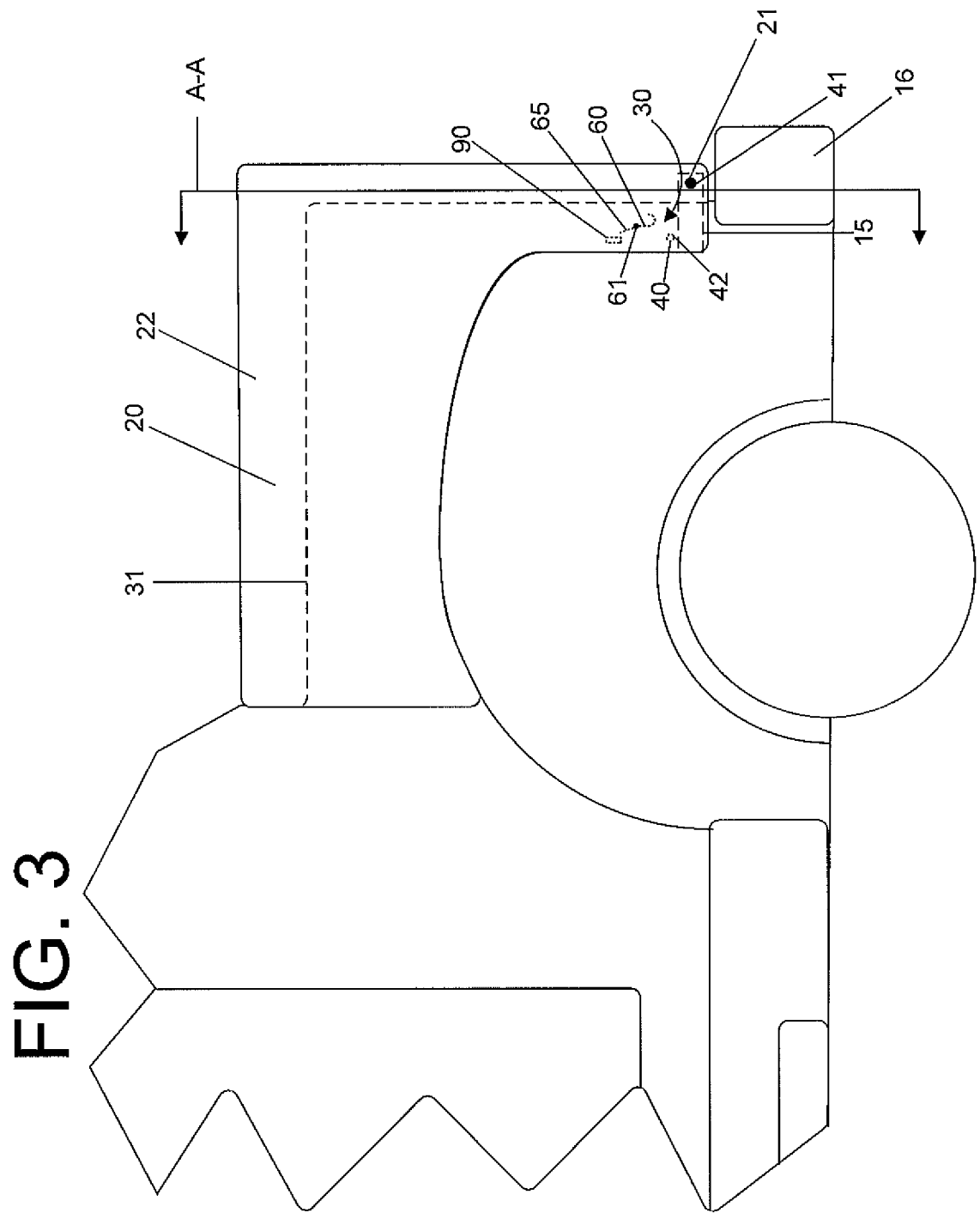
FIG. 3 is a close up view of a vehicle showing a restraint device according to one embodiment in relation to a hood in a closed position.
Figure 4:
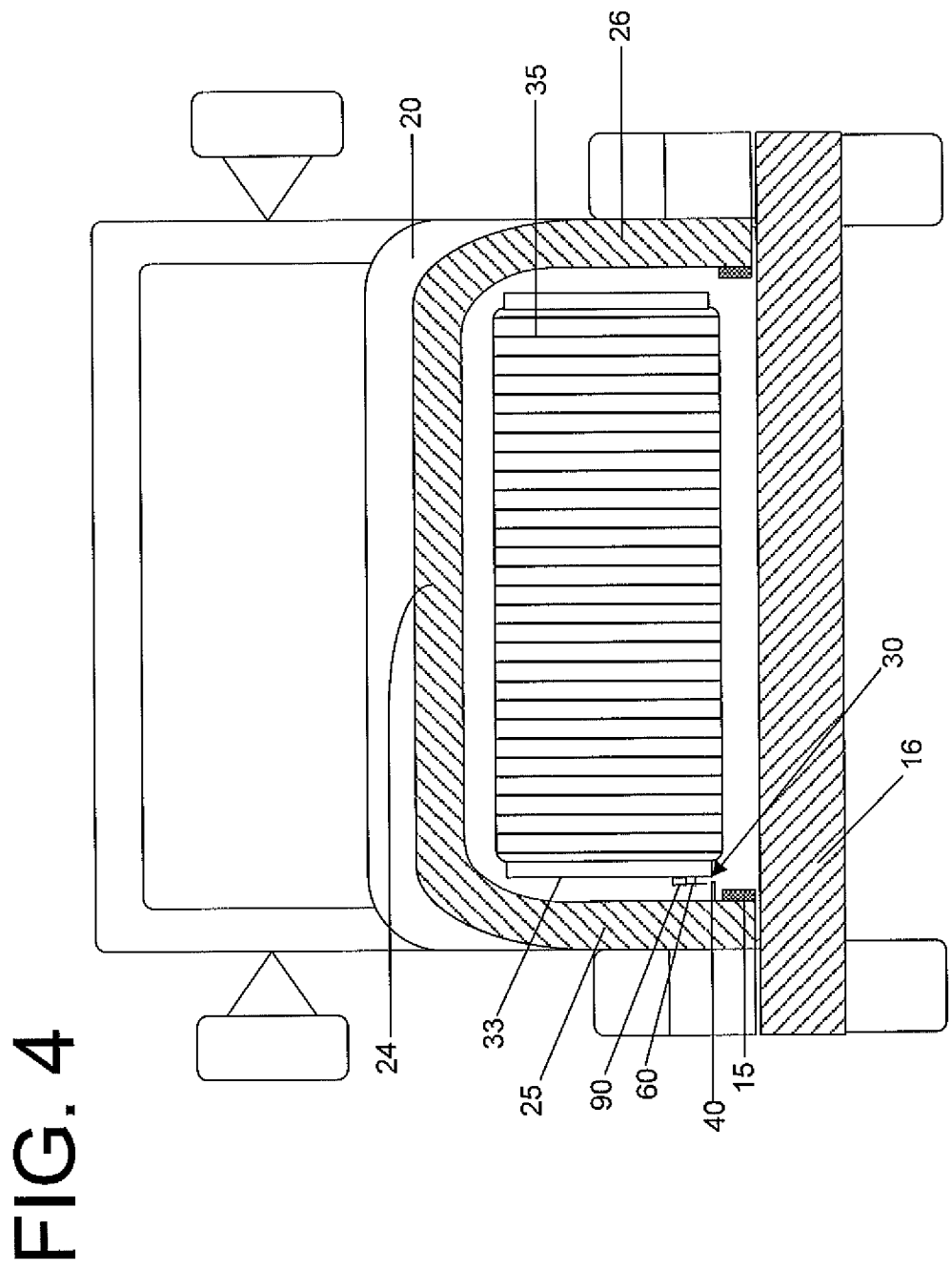
FIG. 4 is a partial sectional view along line A-A in FIG. 3, showing a restraint device according to one embodiment in relation to a hood in a closed position.

FIGS. 1 and 2 depict a vehicle 10, which is preferably provided with a restraint device 30 as shown in FIGS. 3 and 4. As shown, the vehicle 10 may be a conventional truck tractor. The vehicle depicted includes a hood 20 that rotates about a hood axis of rotation 21 between a closed hood position 22, shown in FIG. 1, and an open hood position 23, shown in FIG. 2. The hood 20 may be journaled to one or more mounting brackets 15 positioned above the top of a bumper 16, so that the hood is hinged near the top of the bumper 16. Accordingly, in the vehicle depicted, the hood axis of rotation 21 extends through the hood 11 and through one or more mounting brackets 15.

Turning now to FIG. 3, a close up view of the front of the vehicle 10 shown in FIG. 1 is depicted with head lamp 12 (shown in FIGS. 1 and 2) removed. As shown, the vehicle 10 is provided with the restraint device 30 according to one embodiment. Turning now to FIG. 4, a partial sectional view along line A-A of FIG. 3 likewise depicts the restraint device 30 according to one embodiment. As shown in FIGS. 3 and 4, the hood restraint device 20 is provided with a latch 40 and a catch 60.

According to one aspect of the present embodiment, the latch 40 may be connected to the hood 20 of the vehicle 10. Those of ordinary skill in the art will appreciate that the latch 40 may be connected to the hood 20 in a variety of manners, such as, for example, and not limitation, by being integral with the hood 20, secured with fasteners, or mounted to the hood via one or more mounting brackets, such as, mounting brackets 17, 18 (shown in FIG. 5). As shown in the embodiment depicted in FIG. 4, the hood 20 may be provided with a top wall 24, side walls 25, 26, and at least one latch 40, which extends inward relative to an interior surface of one of the side walls 25, 26.

Figure 13:
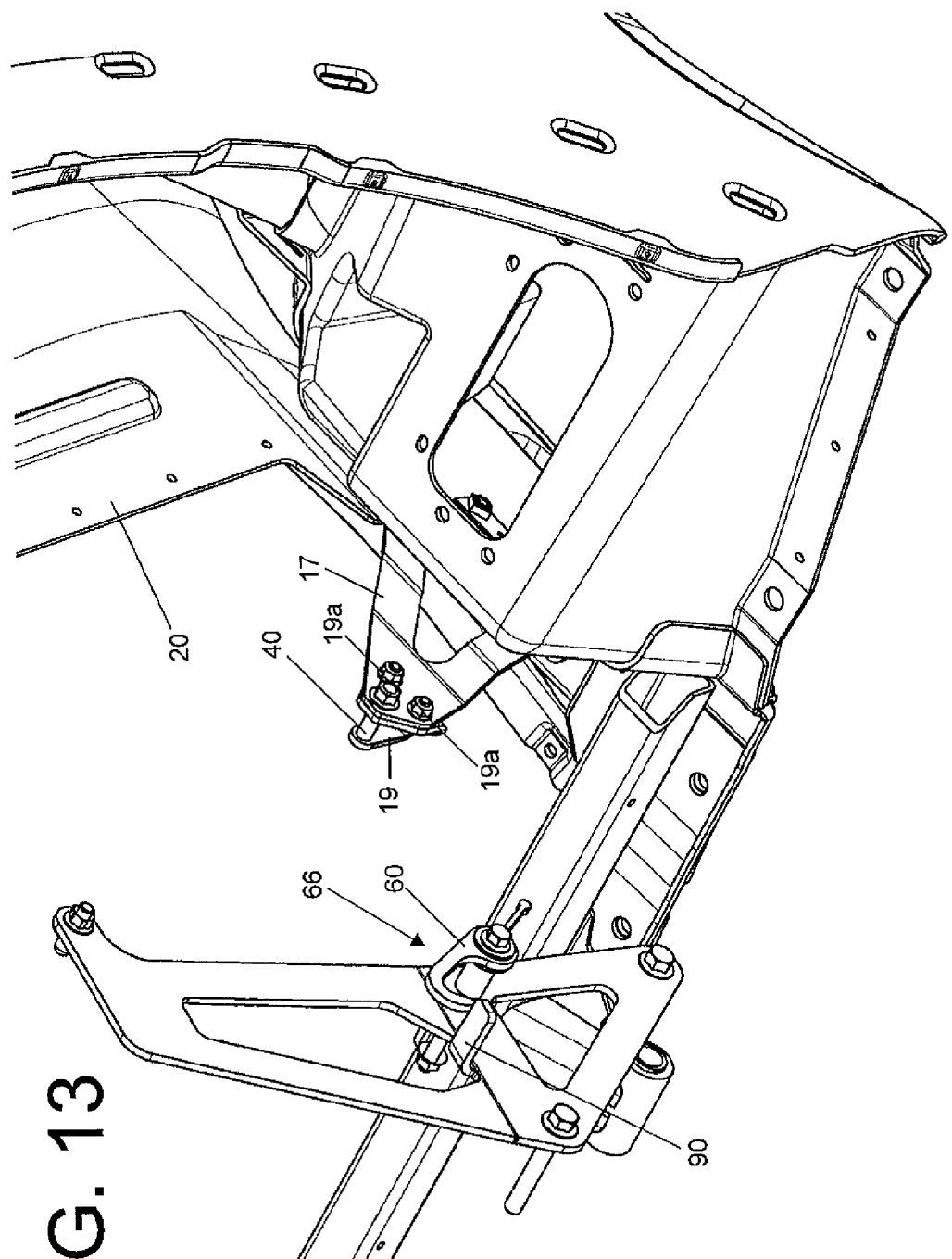
FIG. 13 is a close up perspective view showing a catch of a restraint device according to one embodiment in a second position and the hood in an open position.

As shown best in FIG. 4, the latch 40 may be shaped as an elongated or rod-like member that extends generally orthogonal relative to the direction of travel of the vehicle 10. Furthermore, as shown in FIG. 13, the latch 40 may be buttressed in a number of ways, such as, for example, and not limitation, by positioning the latch 40 so that it extends between a mounting bracket 17 and a buttressing bracket 19, which may be further secured to the mounting bracket 18 as at 19a.

Figure 10:
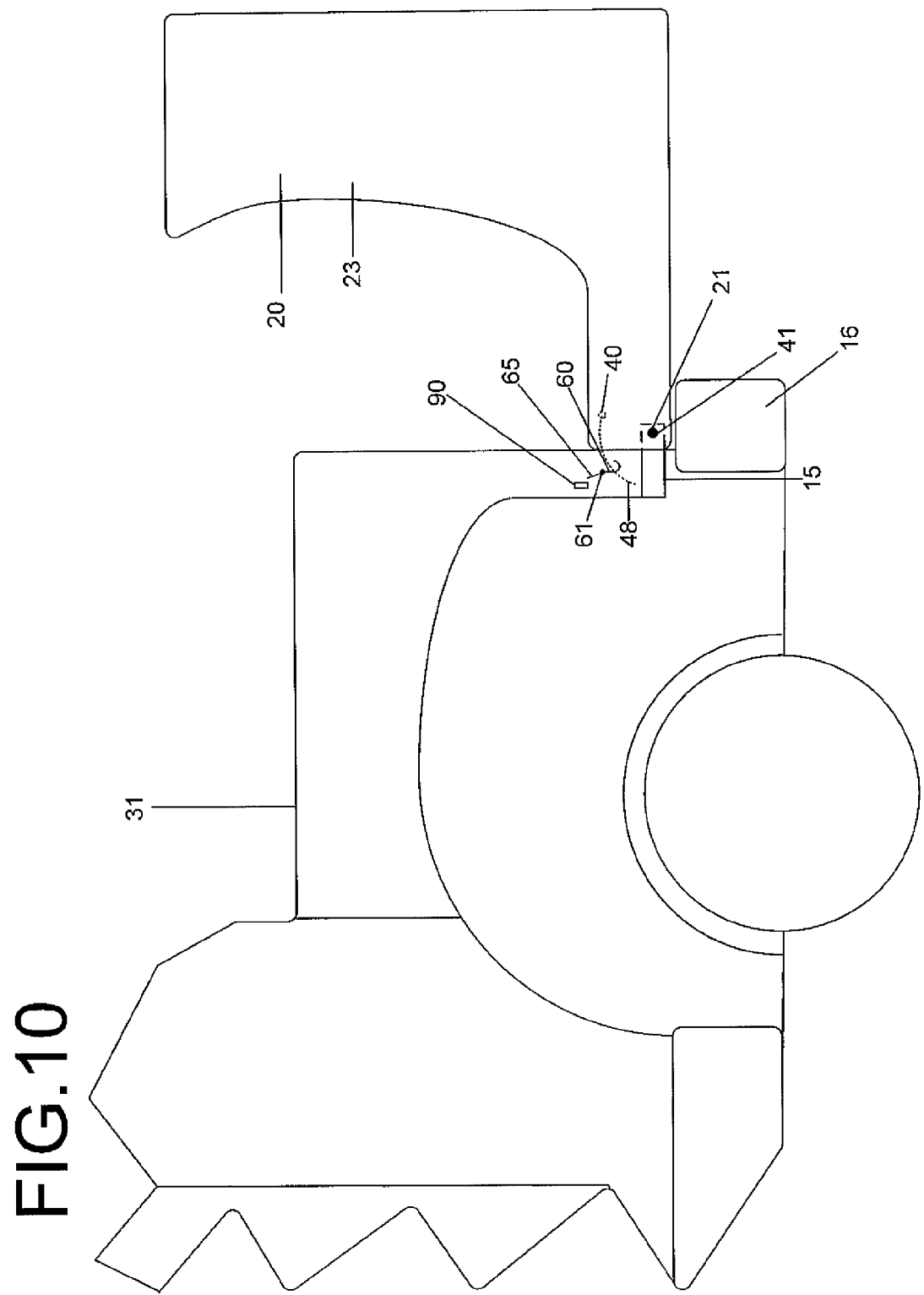
FIG. 10 is a side view of a restraint device according to one embodiment showing a catch of the restraint device in a first position when the hood is open.

As shown in FIGS. 3 and 10, the latch 40 is configured to rotate about a remotely located latch axis of rotation 41, which in the present embodiment corresponds to the hood axis of rotation 21. As shown, the latch 40 may extend generally parallel to the latch axis of rotation 41. According to one aspect of the present embodiment, the latch 40 rotates about the latch axis of rotation 41 between a first latch position 42, as shown in FIG. 3, and a second latch position 43, as shown in FIG. 10, which in the present embodiment, correspond to the closed hood position 22 and the open hood position 23, respectively. As shown in FIG. 10, the latch 40 follows a generally arcuate path of motion 48 between the first latch position 42 and the second latch position 43.

Figure 5:
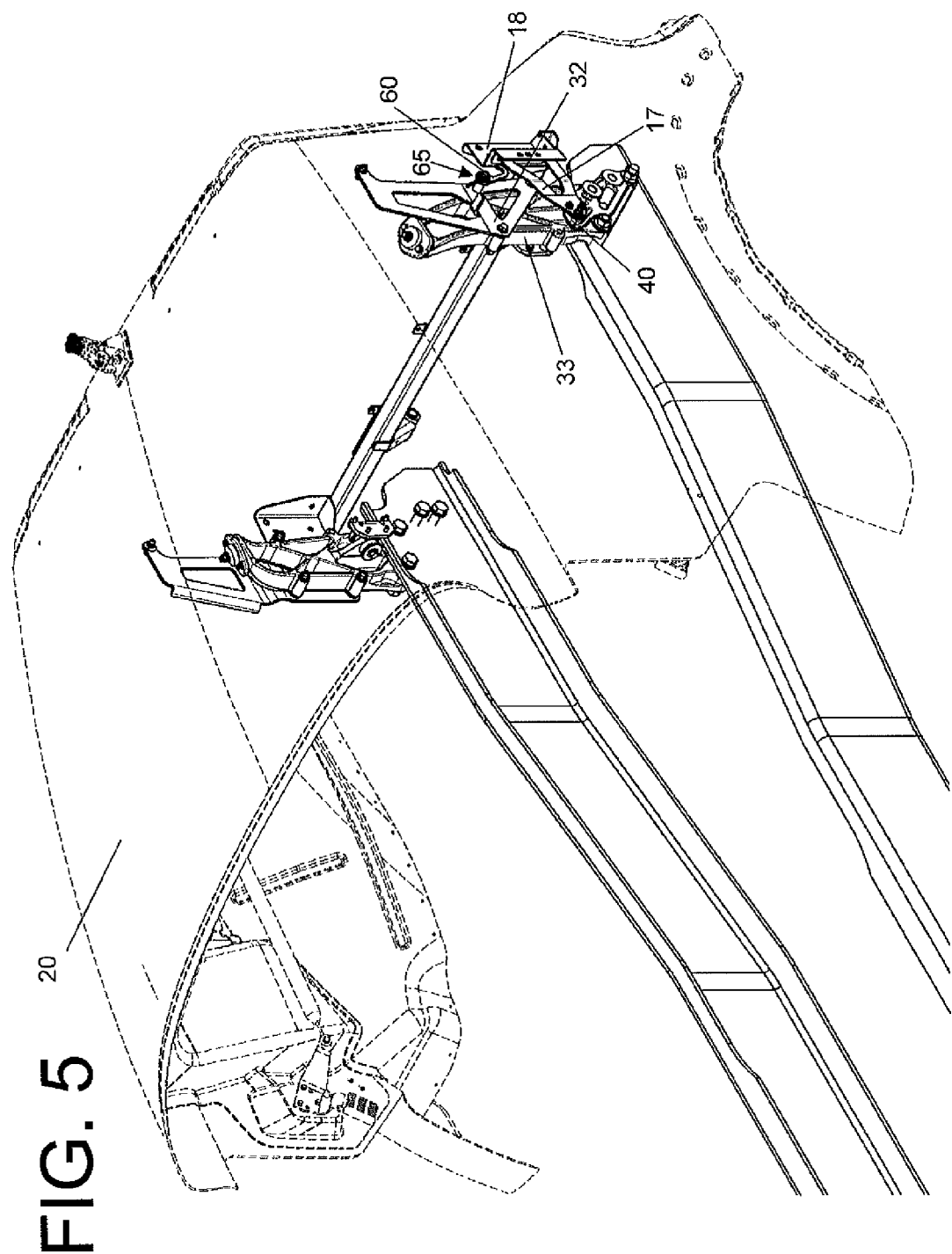
FIG. 5 is a perspective view of a restraint device according to one embodiment in relation to the hood in a closed position.

Turning now to back to FIG. 3, the catch 60 of an embodiment is depicted. According to one aspect of the present embodiment, the catch 60 may be located in the engine compartment 31 of the vehicle 10. Those of ordinary skill in the art will appreciate that the catch 60 may be secured within the engine compartment 31 in a variety of manners, such as, for example, and not limitation, by being integral to any component located therein, secured with fasteners to any component located therein, or mounted to any component located therein via one or more mounting brackets, such as, mounting bracket 32 (shown in FIG. 5). As shown in FIGS. 4 and 5, the present embodiment, the catch 60 may be mounted to a mounting bracket, such as, for example, and not limitation, mounting bracket 32, connected to a frame 33 that supports the radiator 34 of the vehicle 10. As shown in FIGS. 4 and 5, the catch 60 may extend outward relative to the mounting bracket 32, frame 33 and radiator 34 and towards the side wall 25 of the hood 20. As shown in FIG. 3, the catch 60 is positioned above the hood axis of rotation 121 and the latch axis of rotation 141. Also shown, the catch 60 is positioned closer to the rear of the vehicle 10 the than the hood axis of rotation 121 and the latch axis of rotation 141.

Figure 19:
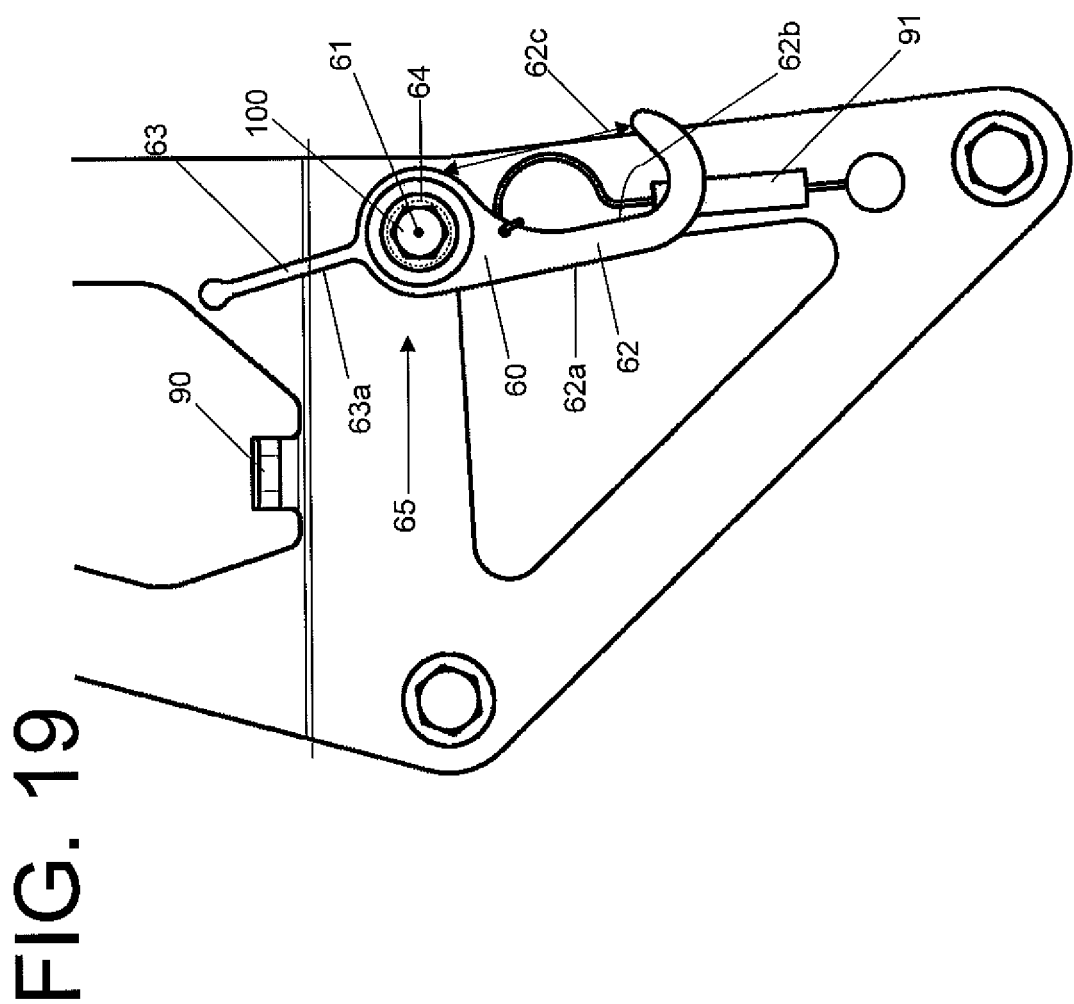
FIG. 19 is a side view showing a catch of a restraint device according to one embodiment in a first position.
Figure 20:
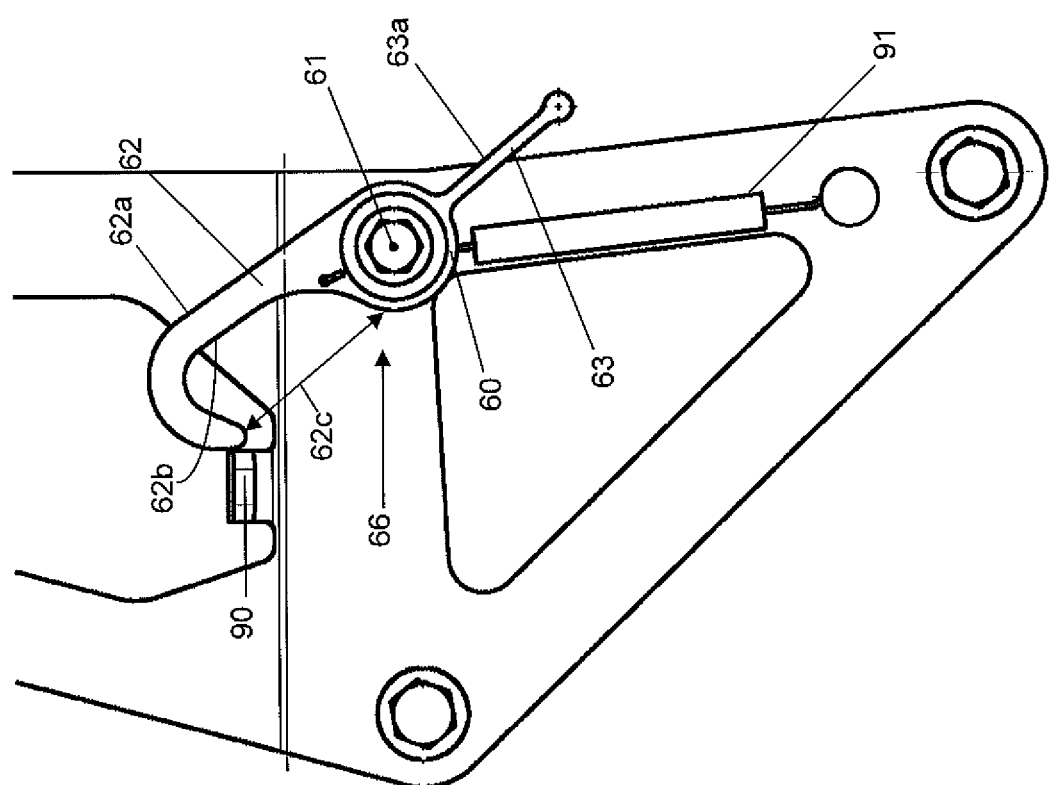
FIG. 20 is a side view showing a catch of a restraint device according to one embodiment in a second position.

As shown best in FIGS. 19 and 20, the catch 60 is provided with a first arm 62. As shown the first arm 62 may be provided with a hooked shape. According to one aspect of the present embodiment, the first arm 62 is provided with a first arm rotation inducing side 62a and a latch receiving side 62b. As shown the first arm rotation inducing side 62a and the latch receiving side 62b are on opposing sides of the first arm 62. As shown, the latch receiving side 62b defines a latch receiving opening 62c which is dimensioned to accommodate the latch 40. In the embodiment depicted in FIG. 3, the latch receiving opening 62c may face toward the front of the vehicle 10.

As shown in FIG. 3, the catch 60 is provided with a second arm 63. As shown in the embodiment depicted, the first arm 62 and the second arm 63 may extend in generally opposite directions relative to a catch axis of rotation 61. As shown in the embodiment depicted, the second arm 63 may be provided as a tang. According to one aspect of the present embodiment, the second arm 63 is provided with a second arm rotation inducing side 63a.

In the present embodiment, the catch 60 is rotatably mounted about the catch axis of rotation 61, which extends through the catch 60. Those of ordinary skill in the art will appreciate that a variety of means can be employed to rotatably mount the catch 60 about the catch axis of rotation 61. As shown in FIG. 19, the catch 60 may define a generally cylindrical bore 64 through which a shaft-like member extends. As shown, in the present embodiment, a bolt 100, which secures the catch to the bracket 32, may extend through the generally cylindrical bore 64. Those of ordinary skill in the art will appreciate that the catch 60 may rotate about the bolt 100, which may be secured to a nut for purposes of securing the catch 60.

According to one aspect of the present embodiment, the catch 60 rotates about the catch axis of rotation 61 between the first catch position 65, shown in FIG. 19, and the second catch position 66, shown in FIG. 20. As shown in FIG. 19, when the catch 60 is in the first catch position 65, the first arm 62 may extend downward relative to the catch axis of rotation 61 and the second arm 63 may extend upward relative to the catch axis of rotation 61. As shown in FIG. 20, when the catch 60 is in the second position 66, the first arm 62 may extend upward relative to the catch axis of rotation 61 and the second arm 63 may extend downward relative to the catch axis of rotation 61. Accordingly, when the catch 60 is in the second position 66, the first arm 62 may extend in a generally opposite direction relative to the direction the first arm 62 extends when the catch 60 is in the first position 65. Similarly, when the catch 60 is in the second position 66, the second arm 63 may extend in a generally opposite direction relative to the direction the second arm 63 extends when the catch 60 is in the first position 65.

Figure 7:
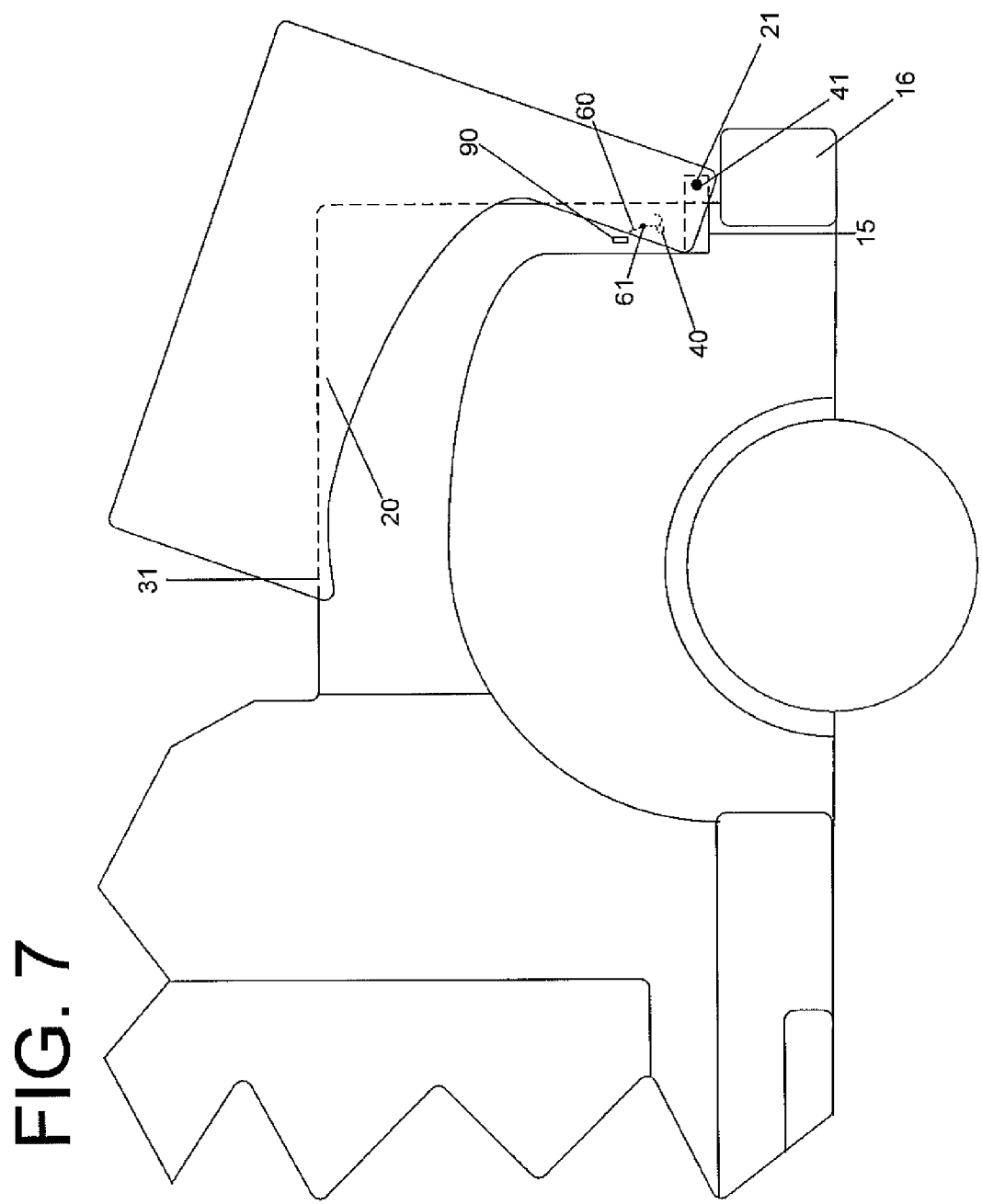
FIG. 7 is a side view of a restraint device according to one embodiment showing the restraint device as the hood transitions from a closed position toward an open position.
Figure 8:
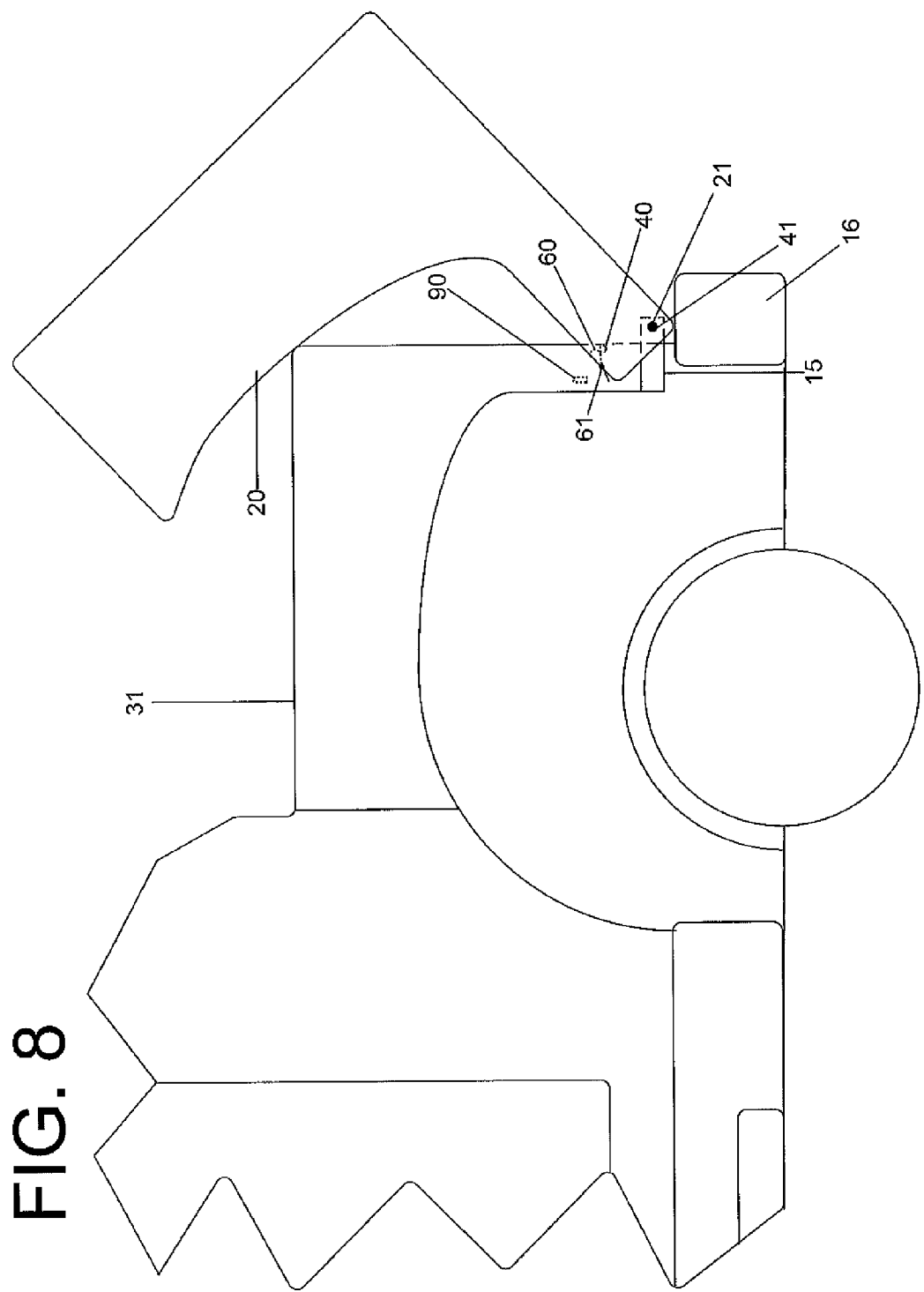
FIG. 8 is a side view of a restraint device according to one embodiment showing the restraint device as the hood transitions from a closed position toward an open position.

As shown, in FIG. 20, when the catch 60 is in the second position 66, the first arm 62 may contact and rest against a stop 90, which limits rotation of the catch 60 about the catch axis of rotation 61. As shown in FIGS. 7 and 8, the stop 90 is positioned so that the second arm 62 may rotate past the stop 90 unimpeded. The stop 90 may be provided as a structure, such as a bar or tab, located in the engine compartment 31, such as, for example, and not limitation, on the mounting bracket 32 or the frame 33.

According to one aspect of the present embodiment, once the catch 60 is in the first catch position 65, the catch 60 is configured to remain in the first catch position 65 in the absence of a force being applied to the catch 60. According to another aspect of the present embodiment, once the catch 60 is the second position 66, the catch 60 is configured to remain in the second catch position 66 in the absence of force being applied to the catch 60. In the presently depicted embodiment, in the absence of force being applied, the first and second arms 62 and 63 are provided with appropriate masses that maintain the catch 60 in the first and second catch positions 65, 66; however, as shown in FIGS. 19 and 20 a biasing member 91, such as, for example, and not limitation, a spring, may be employed to bias the catch in the first and second catch positions 65, 66. The biasing member 91 may also be used to prevent the catch 60 from vibrating or rattling during the operation of the vehicle 10 and to reduce wear.

Figure 14:
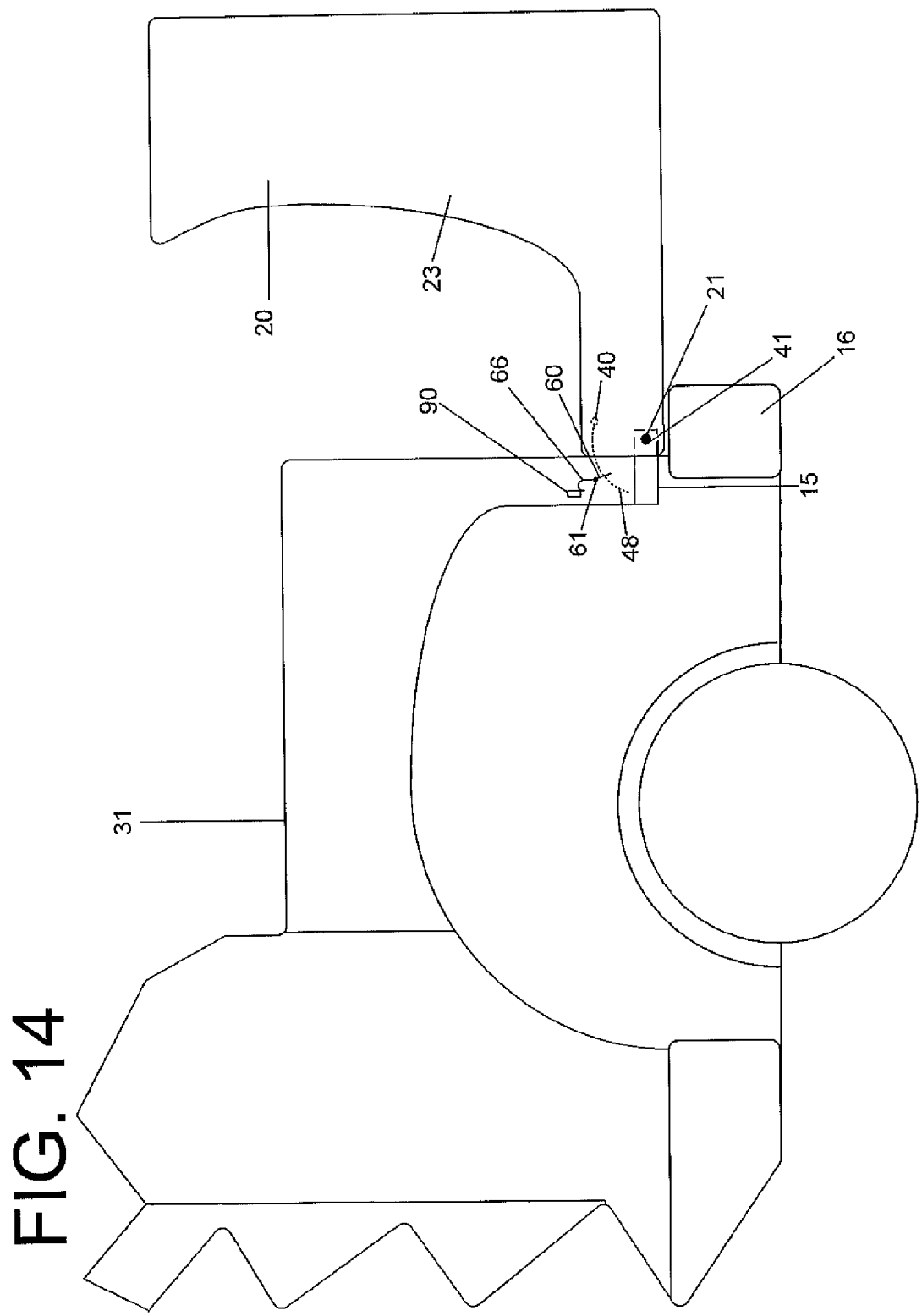
FIG. 14 is a side view showing a catch of a restraint device according to one embodiment in a second position and the hood in an open position.

Turning now to FIGS. 3 and 5-18, a series of progressions is shown which illustrate the various relationships between the hood 20, latch 40, and catch 60 according to various positions of the hood 20, latch 40, and catch 60 of the present embodiment. As shown in FIG. 10, as the latch is moved between the first latch position 42 and the second latch position 43, the latch 40 follows an arcuate path of motion 48 that extends from the first latch position 42 to the second latch position 43 and passes below a catch axis of rotation 61. As shown in FIG. 12, when the catch 60 is in the first catch position 65, the arcuate path of motion 48 extends across the first arm 62 of the catch 60. As shown in FIG. 14, when the catch 60 is in the second catch position 66, the arcuate path of motion 48 extends across the second arm 63 of the catch 60.

According to one aspect of the present embodiment, the latch 40 and the catch 60 are configured to cooperate so that the hood 20 can rotate about the hood axis of rotation 21 from the closed hood position 22 to the open hood position 23. According to another aspect of the present embodiment, the latch 40 and the catch 60 are configured to cooperate so that the latch 40 can rotate about the latch axis of rotation 41 from the first latch position 42 to the second latch position 43.

Figure 6:
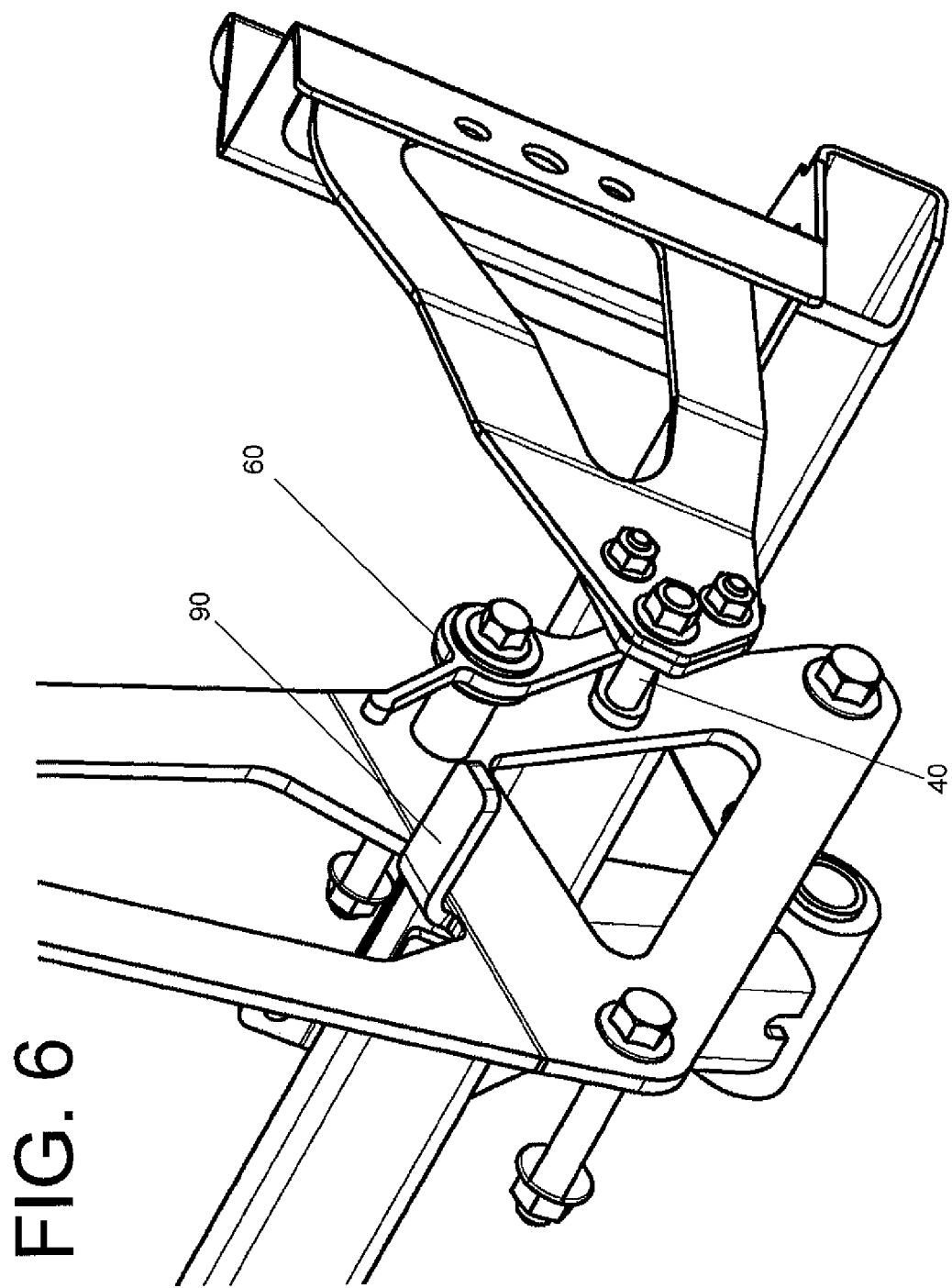
FIG. 6 is a close up perspective view of a restraint device according to one embodiment showing the restraint device as the hood transitions from a closed position toward an open position.

As shown in FIGS. 3 and 5, when the hood 20 is in the closed hood position 22 and the latch 40 is the first latch position 42, the catch 60 is located in the first catch position 65. Turning now to FIGS. 6-8, according to one aspect of the present embodiment, as the hood 20 is transitioned from the closed hood position 22 toward the open hood position 23 and the latch 40 is transitioned from the first latch position 42 toward the second latch position 43, the latch 40 contacts the catch 60 to rotate the catch 60 in a first direction about the catch axis of rotation 61. According to another aspect of the present embodiment, as the hood 20 is transitioned from the closed hood position 22 toward the open hood position 23 and the latch 40 is transitioned from the first latch position 42 toward the second latch position 43, the latch 40 contacts the first arm 62 on the catch 60 to rotate the catch 60 in the first direction about the catch axis of rotation 61. According to yet another aspect of the present embodiment, as the hood 20 is transitioned from the closed hood position 22 toward the open hood position 23 and the latch 40 is transitioned from the first latch position 42 toward the second latch position 43, the latch 40 contacts the first aim rotation inducing side 62a on the first arm 62 of the catch 60 to rotate the catch 60 in the first direction about the catch axis of rotation 61.

Figure 9:
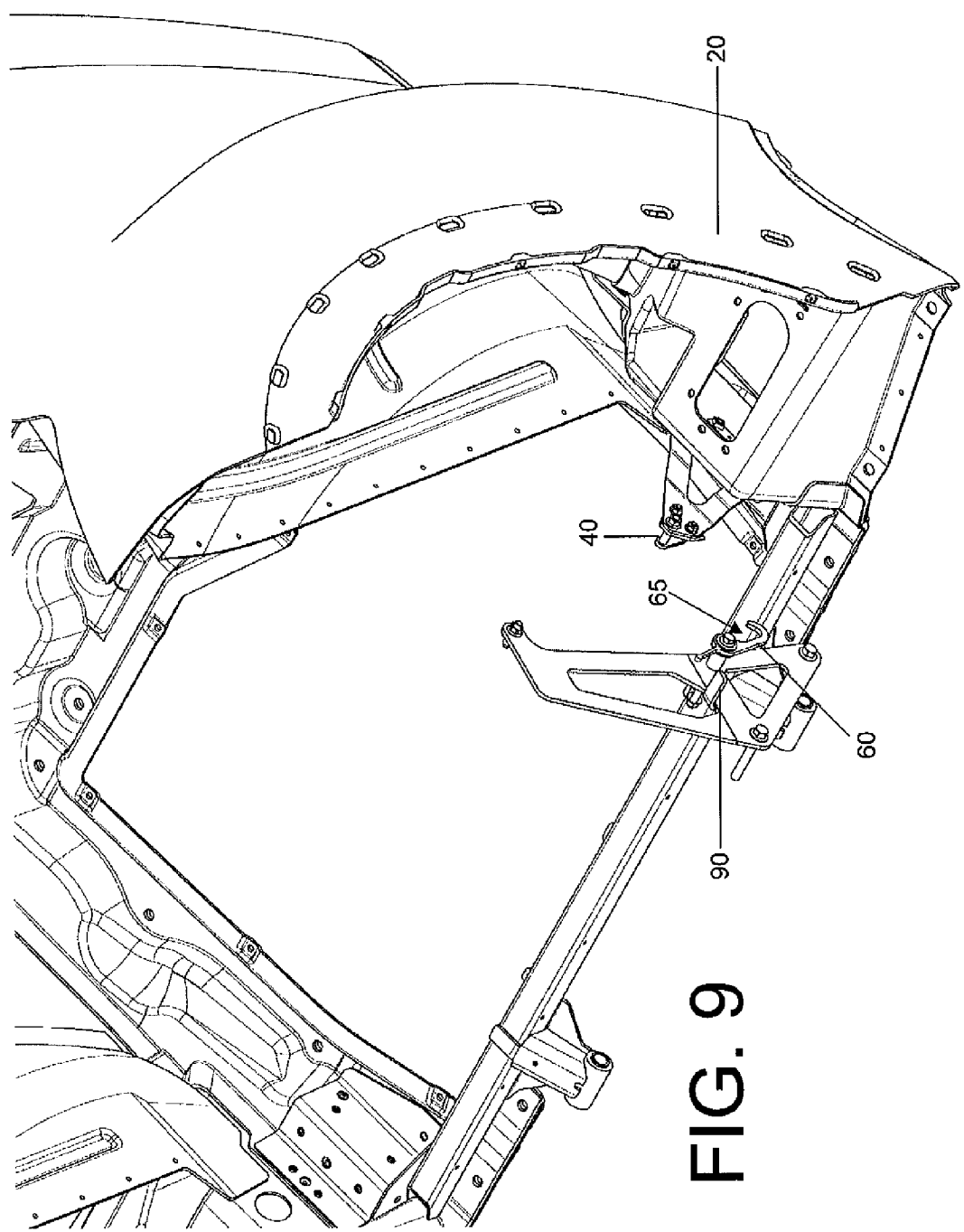
FIG. 9 is a perspective view of a restraint device according to one embodiment showing a catch of the restraint device in a first position when the hood is open.

As shown in FIGS. 9 and 10 as the rotation continues, eventually latch 40 moves past the catch 60, whereupon the catch 60 is weighted or biased to return to the catch first position 65, the hood 20 is allowed to continue to rotate toward the open hood position 23, and the latch 40 is allowed to continue to rotate toward the second latch position 43. Those of ordinary skill in the art will appreciate that in this manner the hood 20 may be opened.

According to another aspect of the present embodiment, when the catch 60 is in the first catch position 65 as the hood 20 begins to rotate about the hood axis of rotation 21, from the open hood position 23 toward the closed hood position 22, the catch 60 is configured to prevent the hood 20 from rotating about the hood axis of rotation 21 from the open hood position 23 to the closed hood position 22. According to yet another aspect of the present embodiment, when the catch 60 is in the first catch position 65 as the latch 40 begins to rotate about the latch axis of rotation 41, from the second latch position 43 toward the first latch position 42, the catch 60 is configured to prevent the latch 20 from rotating about the latch axis of rotation 41 from the second latch position 43 to the first latch position 42.

Figure 11:
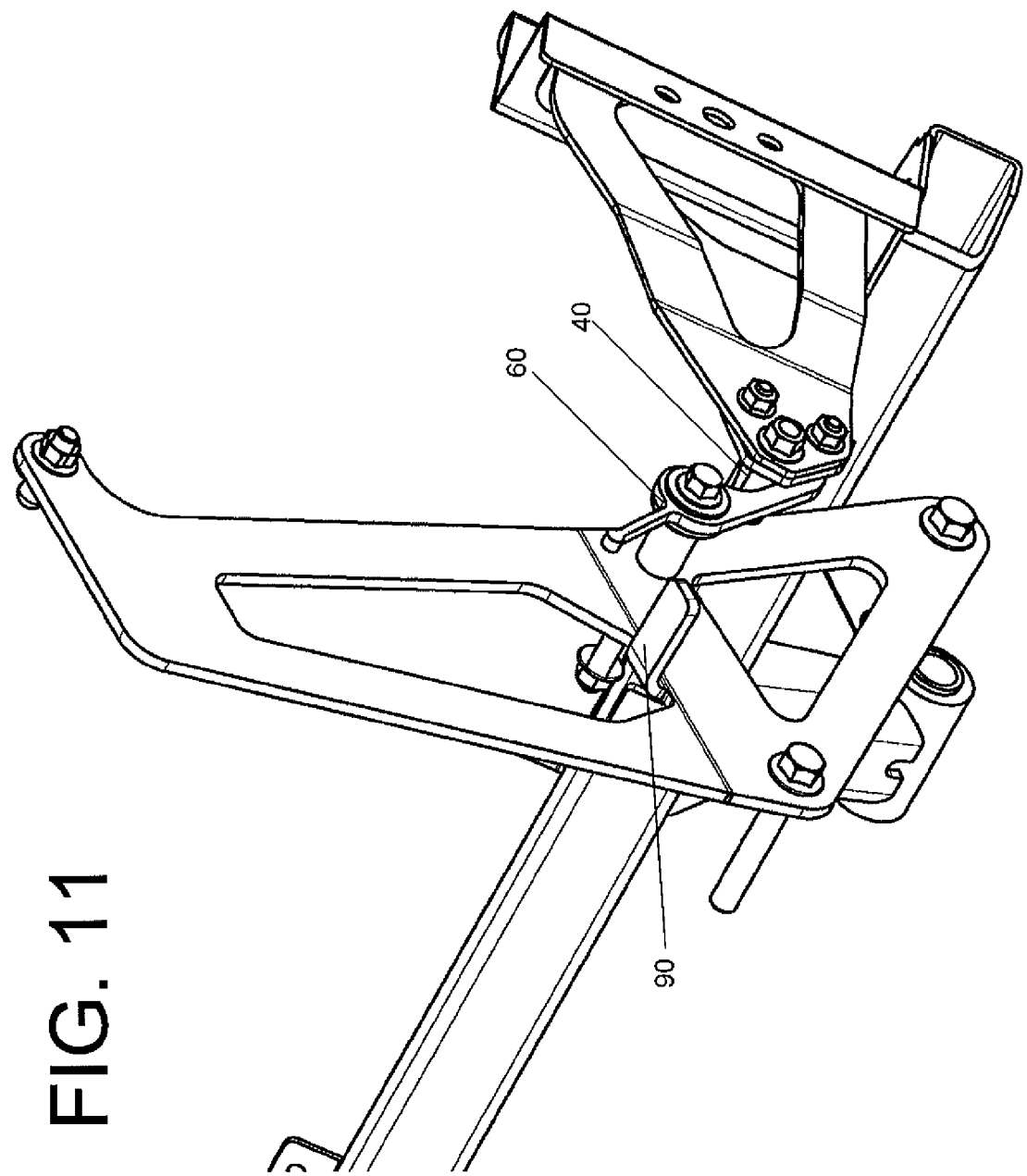
FIG. 11 is a close up perspective view showing a catch of a restraint device according to one embodiment in a first position and preventing the hood from unintentionally closing.
Figure 12:
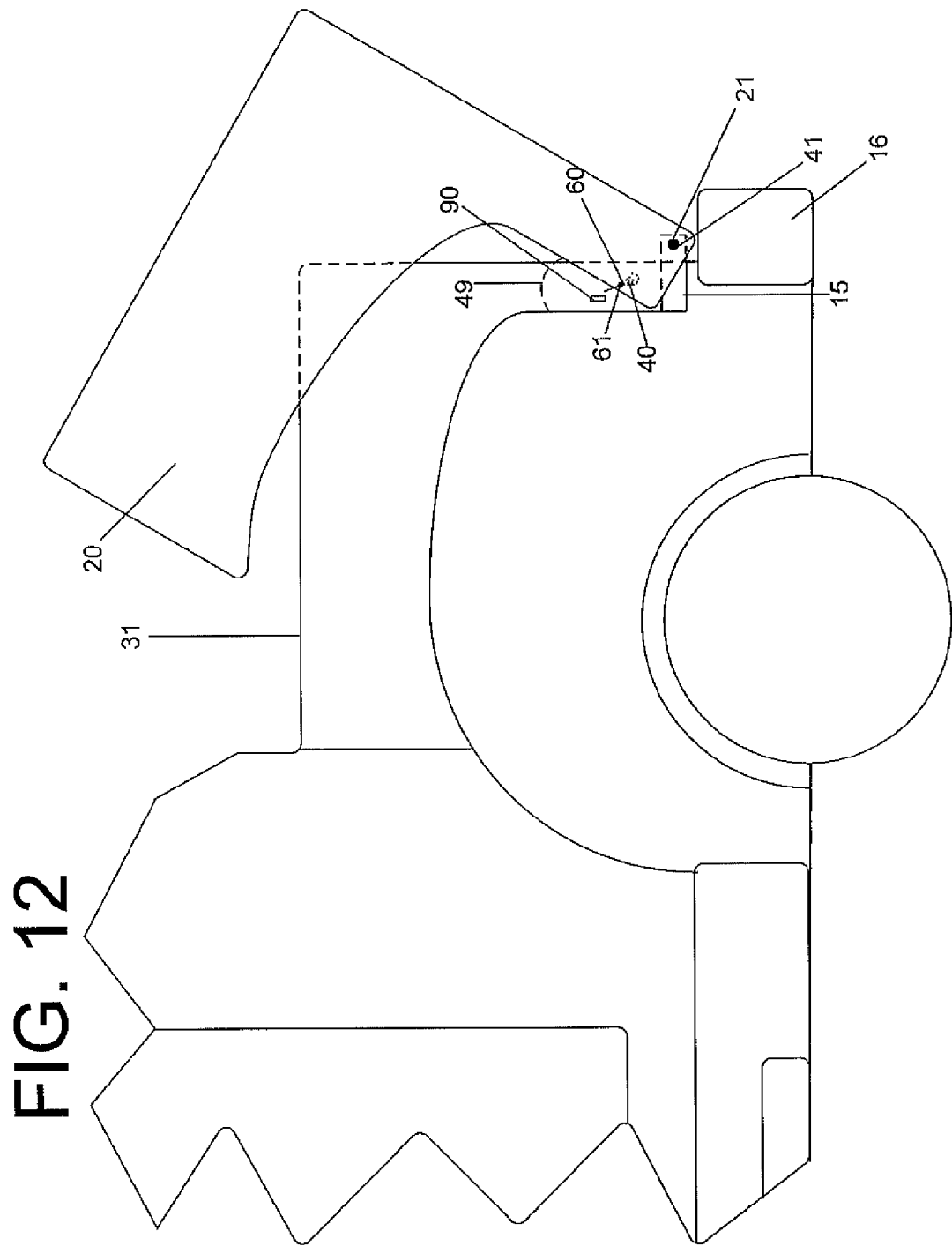
FIG. 12 is a side view showing a catch of a restraint device according to one embodiment in a first position and preventing the hood from unintentionally closing.

As shown in FIGS. 11 and 12, according to one aspect of the present embodiment, once the hood 20 is in the open hood position 23 and the latch 40 is in the second latch position 43, the catch 60, whilst in the first catch position 65 engages and catches the latch 40 to prevent the hood 20 from rotating to the closed hood position 22 and the latch 40 from rotating to the first latch position 42. According to another aspect of the present embodiment, once the hood 20 is in the open hood position 23 and the latch 40 is in the second latch position 43, the first arm 62 of the catch 60, whilst the catch 60 is in the first catch position 65, engages and catches the latch 40 to prevent the hood 20 from rotating to the closed hood position 22 and the latch 40 from rotating to the first latch position 42. According to yet another aspect of the present embodiment, once the hood 20 is in the open hood position 23 and the latch 40 is in the second latch position 43, the latch receiving side 62b on the first arm 62 of the catch 60, whilst the catch 60 is in the first catch position 65, engages and catches the latch 40 to prevent the hood 20 from rotating to the closed hood position 22 and the latch 40 from rotating to the first latch position 42. Those of ordinary skill in the art will appreciate that in this manner unintentional closing of the hood 20 may be prevented.

As shown in FIG. 12, in the present embodiment, the catch 60 is configured to engage the latch 40 to prevent the hood 20 from closing when the hood 20 and latch 40 are at a particular rotational angle 49 relative to the respective closed hood position 22 and first latch position 42. In the embodiment shown in FIG. 12, the angle 49 is approximately 30°; however, it is within the scope of the present embodiment to use angles that are less than or greater than 30°. By way of example, the angle 49 may be 50°. By way of yet another example, the angle 49 may be selected so that it is any degree that is substantially less than or equal to a balance point for the hood 20. Those of ordinary skill in the art will appreciate that the balance point corresponds to an angle of rotation about said hood axis of rotation whereat further rotation toward the closed hood position will thereafter cause said hood to rotate toward the close hood position under the hoods own weight. By way of example, if the balance point was 75° of rotation relative to the closed hood position 21, the catch 60 may engage the latch 40 at any angle that is substantially less than or equal to 75°. Although the angle may be selected to be substantially less than or equal to a balance point, those of ordinary skill in the art will appreciate that it is within the scope of the present invention for any particular angle 49 to be selected, including those that are greater than any balance point.

According to yet another aspect of the present embodiment, when the catch 60 is in the second catch position 66 as the hood 20 begins to rotate about the hood axis of rotation 21, from the open hood position 23 toward the closed hood position 22, the catch 60 permits the hood 20 to rotate about the hood axis of rotation 21 from the open hood position 23 to the closed hood position 22. According to still another aspect of the present embodiment, when the catch 60 is in the second catch position 66 as the latch 20 begins to rotate about the latch axis of rotation 41, from the second latch position 43 toward the first latch position 42, the catch 60 permits the latch 20 to rotate about the latch axis of rotation 41 from the second latch position 43 to the first latch position 42.

According to still another aspect of the present embodiment, when the catch 60 is in the second catch position 66 as the hood 20 begins to rotate about the hood axis of rotation 21, from the open hood position 23 toward the closed hood position 22, the hood 20 and the catch 60 cooperate to transition the catch 60 from the second catch position 66 to the first catch position 65 as the latch 40 moves past the catch 60. According to still yet another aspect of the present embodiment, when the catch 60 is in the second catch position 66 as the latch 20 begins to rotate about the latch axis of rotation 41, from the second latch position 43 toward the first latch position 42, the latch 40 and the catch 60 cooperate to transition the catch 60 from the second catch position 66 to the first catch position 65 as the latch 40 moves past the catch 60.

Figure 15:
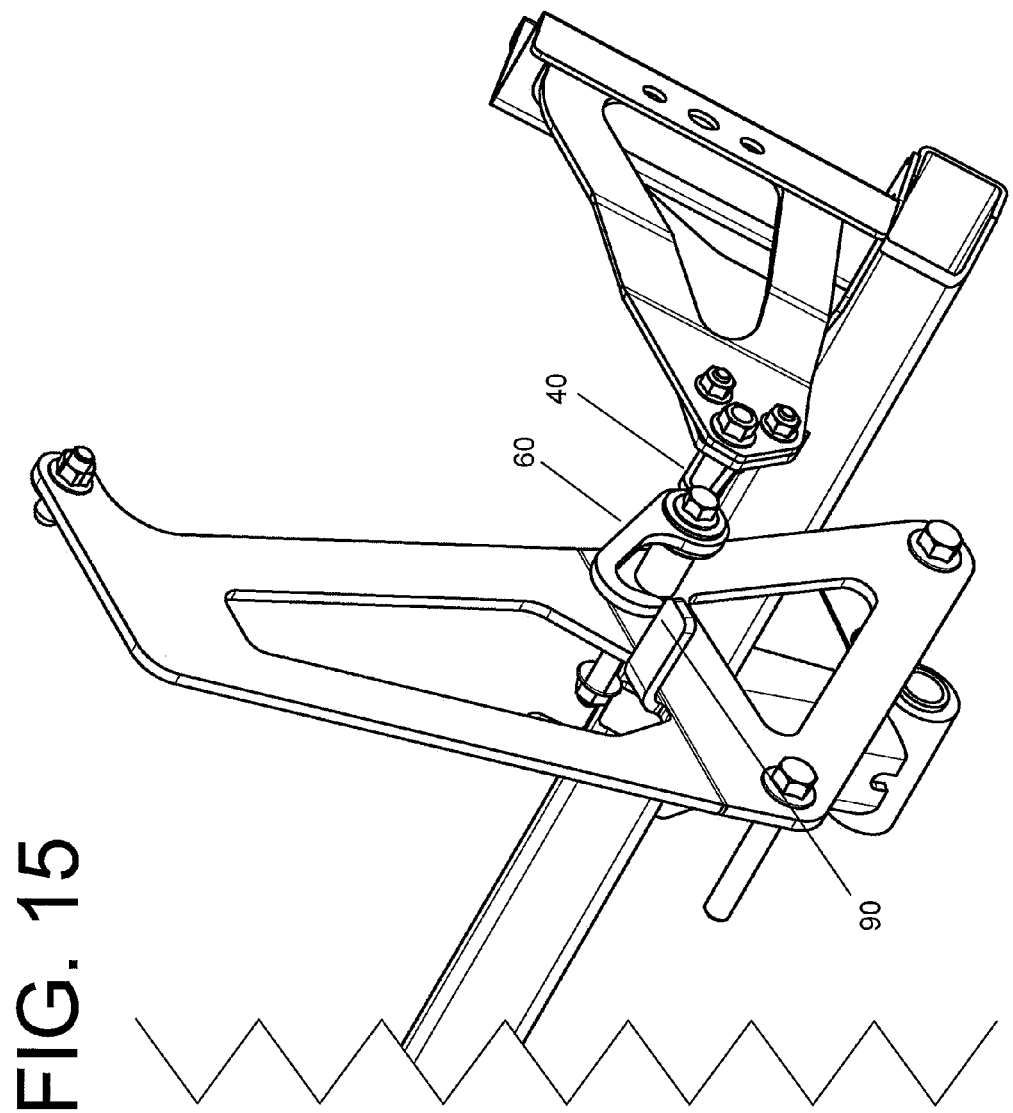
FIG. 15 is a close up perspective view showing the restraint device according to one embodiment as the hood moves from an open position to a closed position.
Figure 16:
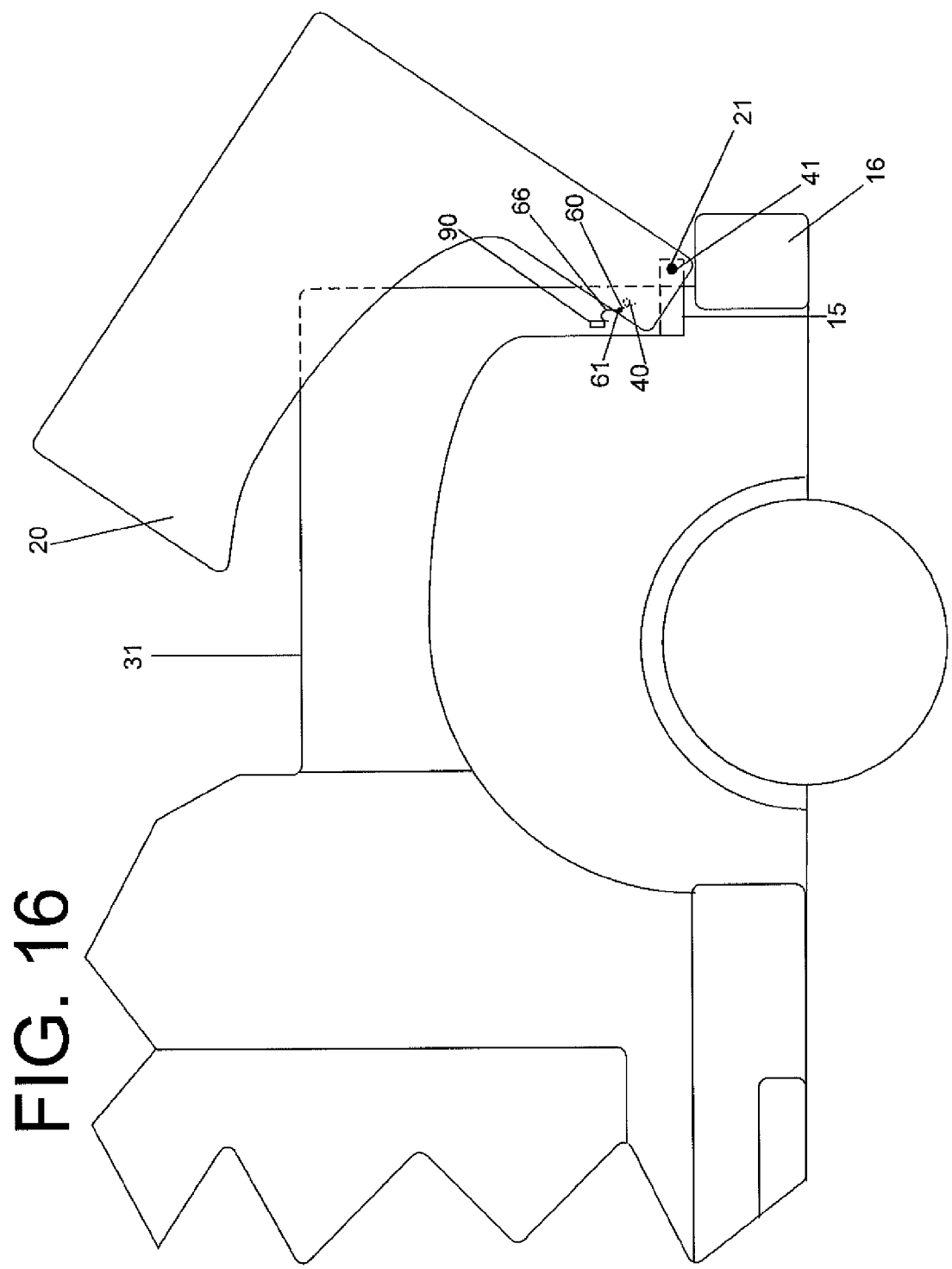
FIG. 16 is a side view showing the restraint device according to one embodiment as the hood moves from an open position to a closed position.
Figure 17:
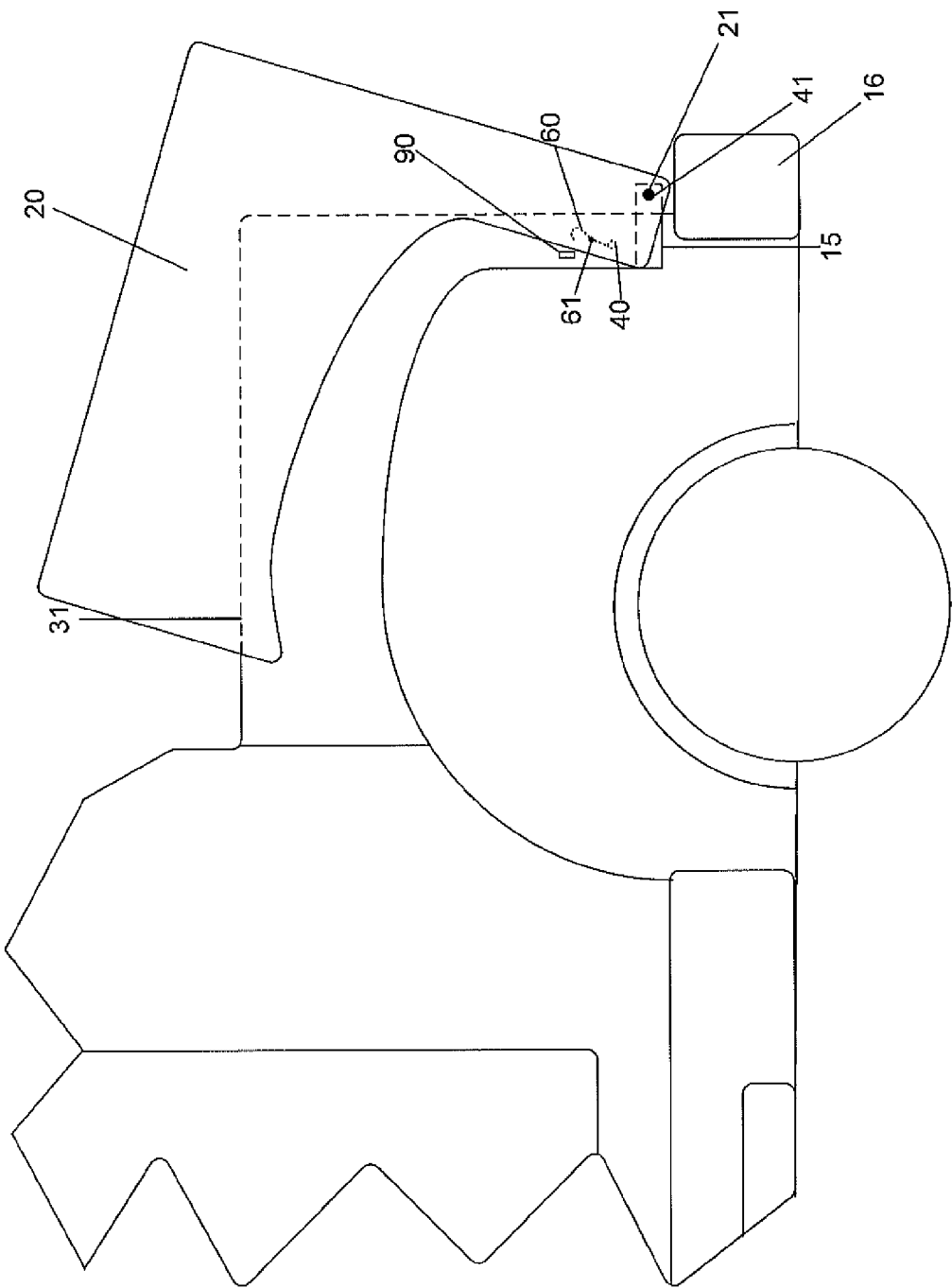
FIG. 17 is a side view showing the restraint device according to one embodiment as the hood moves from an open position to a closed position.

Turning now to FIGS. 13-17, when it is desired to transition the hood 20 from the open hood position 23 to the closed hood position 22 and the latch 40 from the second latch position 43 to the first latch position 42, the catch 60 is rotated to the second catch position 66, as shown in FIGS. 13 and 14. As shown in FIGS. 15-17, according to one aspect of the present embodiment, when in the second catch position 66, the catch 60 is positioned so that the latch 40 may contact the catch 60 and rotate the catch 60 in the second direction, which is opposite to the first direction. According to another aspect of the present embodiment, when in the second catch position 66, the second arm 63 of the catch 60 is positioned so that the latch 40 may contact the second arm 63 and rotate the catch 60 in the second direction. According to yet another aspect of the present embodiment, when in the second catch position 66, the second arm rotation inducing side 63a on the second arm 63 of the catch 60 is positioned so that the latch 40 may contact the second arm rotation inducing side 63a and rotate the catch 60 in the second direction.

Figure 18:
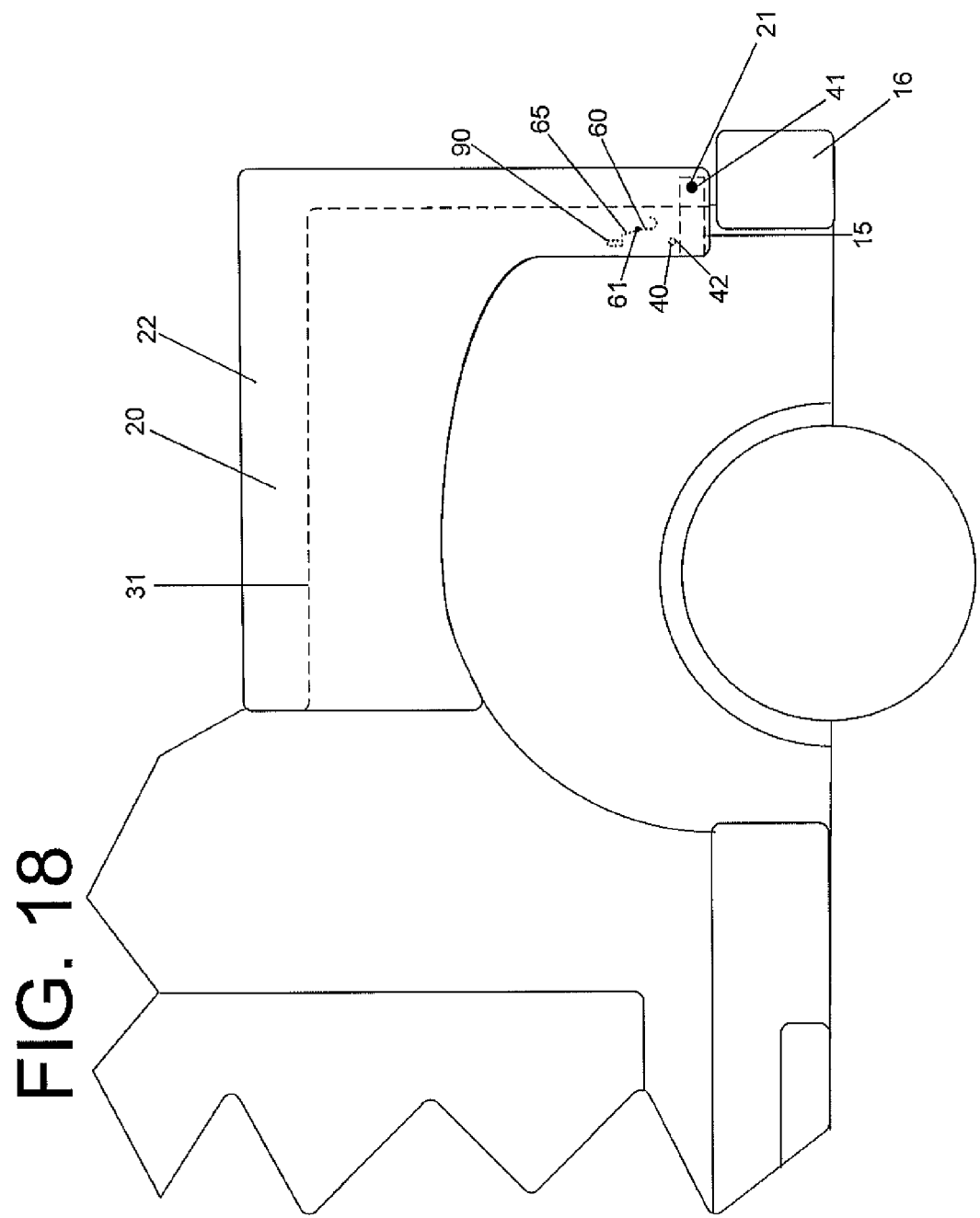
FIG. 18 is a side view showing the restraint device according to one embodiment when the hood is in a closed position.

As shown in FIG. 18, as the rotation in the second direction occurs, eventually the latch 40 moves past the catch 60, whereupon the catch 60 is weighted or biased to return to the catch first position 65, the hood 20 is allowed to continue to rotate to the closed hood position 22, and the latch 40 is allowed to continue to rotate to the first latch position 42. Those of ordinary skill in the art will appreciate that in this manner the hood 20 may be closed.

As shown in the above examples, the restraint device 30 of the present embodiment provides a simple way to prevent a hood 20 from closing unintentionally, while allowing the hood 20 to be opened and closed.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventors to be within the scope of the invention. By way of example, and not limitation, although the restraint device 30 is discussed for use in conjunction with a hood 20, those of ordinary skill in the art will appreciate that the principals of the present invention may be employed in other contexts within the scope of the present invention. Furthermore, although embodiments may be provided with a stop, such as stop 90, those of ordinary skill in the art will appreciate that other means may be employed to limit rotation of the catch 60. By way of example, and not limitation, in embodiments provided with a biasing member, such as, biasing member 91, the biasing member may be employed in such a manner. Moreover, although embodiments may be provided with a first arm 62 and second arm 63 on a catch 60 that extend in substantially opposite directions relative to the catch axis of rotation 61, those of ordinary skill in the art will appreciate that other orientations may be used. By way of example, and not limitation, and particularly in the case of, but not limited to, embodiments provided with a biasing member, such as, biasing member 91, the second arm 63 may extend substantially perpendicularly or at a substantial 90° angle relative to the first arm 62 or at any angle that is greater than or less than 90°.

Persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims.

I claim:

1. A restraint device, comprising:
    a latch rotatable between a first latch position and a second latch position about a latch axis of rotation, which is remote from said latch;
    a catch provided with:
        a first arm;
        a second arm;
    said catch rotatable about a catch axis of rotation between a first catch position and a second catch position, wherein:
        said catch axis of rotation extends through said catch;
        when said catch is in said first catch position:
            said latch, as it is rotated from said first latch position toward said second latch position, contacts said first arm to rotate said catch about said catch axis of rotation, thereby allowing said latch to rotate about said latch axis of rotation past said catch;

said latch, as it is rotated from said second latch position toward said first latch position, contacts said first arm, which thereby engages said latch and restrains further rotation of said latch about said latch axis of rotation toward said first latch position; and when said catch is in said second catch position:

said latch, as it is rotated from said second latch position toward said first latch position, contacts said second arm to rotate said catch about said catch axis of rotation, whereby said catch transitions from said second position to said first position as said latch rotates about said latch axis of rotation past said catch and toward said first latch position.

2. The restraint device according to claim 1, wherein:

said catch rotates about said catch axis of rotation in a first direction from said first catch position to said second catch position; and said catch rotates in a second direction, opposite to said first direction, about said catch axis of rotation said second catch position to said first catch position.

3. The restraint device according to claim 1, wherein said latch is an elongated member that extends parallel to said latch axis of rotation.

4. The restraint device according to claim 1, wherein said first arm is provided with a hooked shape.

5. The restraint device according to claim 1, wherein said first arm extends in a generally opposite direction as said second arm, relative to said catch axis of rotation.

6. The restraint device according to claim 1, wherein when said catch is in said first catch position, said first arm extends downward relative to catch axis of rotation and second arm extends upward relative to catch axis of rotation.

7. The restraint device according to claim 1, wherein when said catch is in said second catch position, said first arm extends upward relative to catch axis of rotation and second arm extends downward relative to catch axis of rotation.

8. The restraint device according to claim 1, further comprising a stop that contacts said catch to limit rotation of said catch about said catch axis of rotation.

9. The restraint device according to claim 1, further comprising a stop wherein said first arm contacts said stop when in said second position to limit rotation of said catch about said catch axis of rotation and wherein said second arm rotates past said stop as said catch transitions from said first position to said second position.

10. The restraint device according to claim 1, wherein said catch is weighted to remain in said first catch position in an absence of force being applied to said catch.

11. The restraint device according to claim 1, wherein said catch is weighted to remain in said second catch position in an absence of force being applied to said catch.

12. The restraint device according to claim 1, further comprising a biasing member that biases said catch in said first catch position.

13. The restraint device according to claim 1, further comprising a biasing member that biases said catch in said second catch position.

14. The restraint device according to claim 1, further comprising a biasing member that biases said catch in said first catch position when said catch is in said first catch position and that biases said catch in said second catch position when said catch is in said second position.

15. The restraint device according to claim 1, wherein said latch follows a generally arcuate path of motion from said first latch position to said second latch position, said arcuate path of motion passing below said catch axis of rotation.

16. The restraint device according to claim 1, further comprising a vehicle including a hood and an engine compartment, wherein:

said hood rotates about a hood axis of rotation, which corresponds to the latch axis of rotation, between an open hood position and a closed hood position;

said latch is connected to the hood, whereby the latch rotates with the hood;

said first latch position corresponds to said closed hood position and said second latch position corresponds to an open hood position; and said catch is rotatably mounted in said engine compartment.

17. The restraint device according to claim 1, further comprising a vehicle including a hood and an engine compartment, wherein:

said hood rotates about a hood axis of rotation, which corresponds to the latch axis of rotation, between an open hood position and a closed hood position;

said latch is connected to the hood, whereby the latch rotates with the hood;

said latch extends generally orthogonal relative to a direction of travel of said vehicle;

said first latch position corresponds to said closed hood position and said second latch position corresponds to an open hood position; and said catch is rotatably mounted in said engine compartment.

18. The restraint device according to claim 1, further comprising a vehicle including a hood and an engine compartment, wherein:

said hood rotates about a hood axis of rotation, which corresponds to the latch axis of rotation, between an open hood position and a closed hood position;

said latch is connected to the hood, whereby the latch rotates with the hood;

said first latch position corresponds to said closed hood position and said second latch position corresponds to an open hood position;

said hood is provided with a balance point between said open and closed position, said balance point corresponding to an angle of rotation about said hood axis of rotation whereat further rotation toward the closed hood position will thereafter cause said hood to rotate toward the close hood position under said hoods own weight;

said catch is rotatably mounted in said engine compartment;

when in said catch is in said first catch position:

said latch, as it is rotated from said second latch position toward said first latch position, contacts said first arm, which thereby engages said latch and restrains further rotation of said latch about said latch axis of rotation toward said first latch position; and said engagement and restraint occurring at an angle of rotation that is substantially less than or equal to the balance point.

* * * * *